Oct. 18, 1966  N. J. ASMAN  3,279,636
ATTACHMENT FOR WHEELED VEHICLE
Filed Jan. 18, 1965  8 Sheets-Sheet 1

INVENTOR.
NORMAN J. ASMAN
BY
Allan O. Maki
ATTORNEY

Oct. 18, 1966 N. J. ASMAN 3,279,636
ATTACHMENT FOR WHEELED VEHICLE
Filed Jan. 18, 1965 8 Sheets-Sheet 3

INVENTOR.
NORMAN J. ASMAN
BY
Allan O Maki
ATTORNEY

Oct. 18, 1966   N. J. ASMAN   3,279,636
ATTACHMENT FOR WHEELED VEHICLE
Filed Jan. 18, 1965   8 Sheets-Sheet 6

INVENTOR.
NORMAN J. ASMAN
BY
Allan O Maki
ATTORNEY

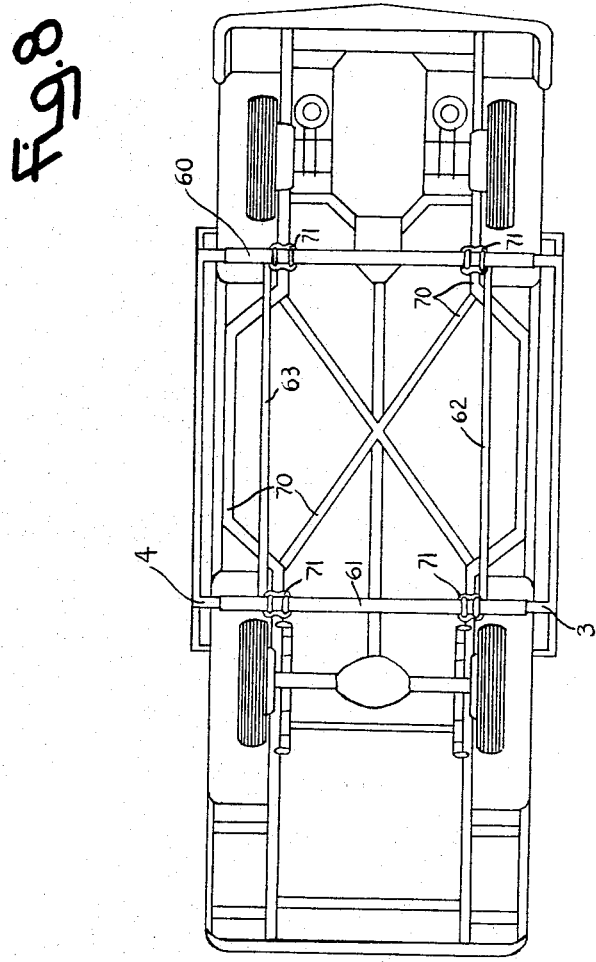

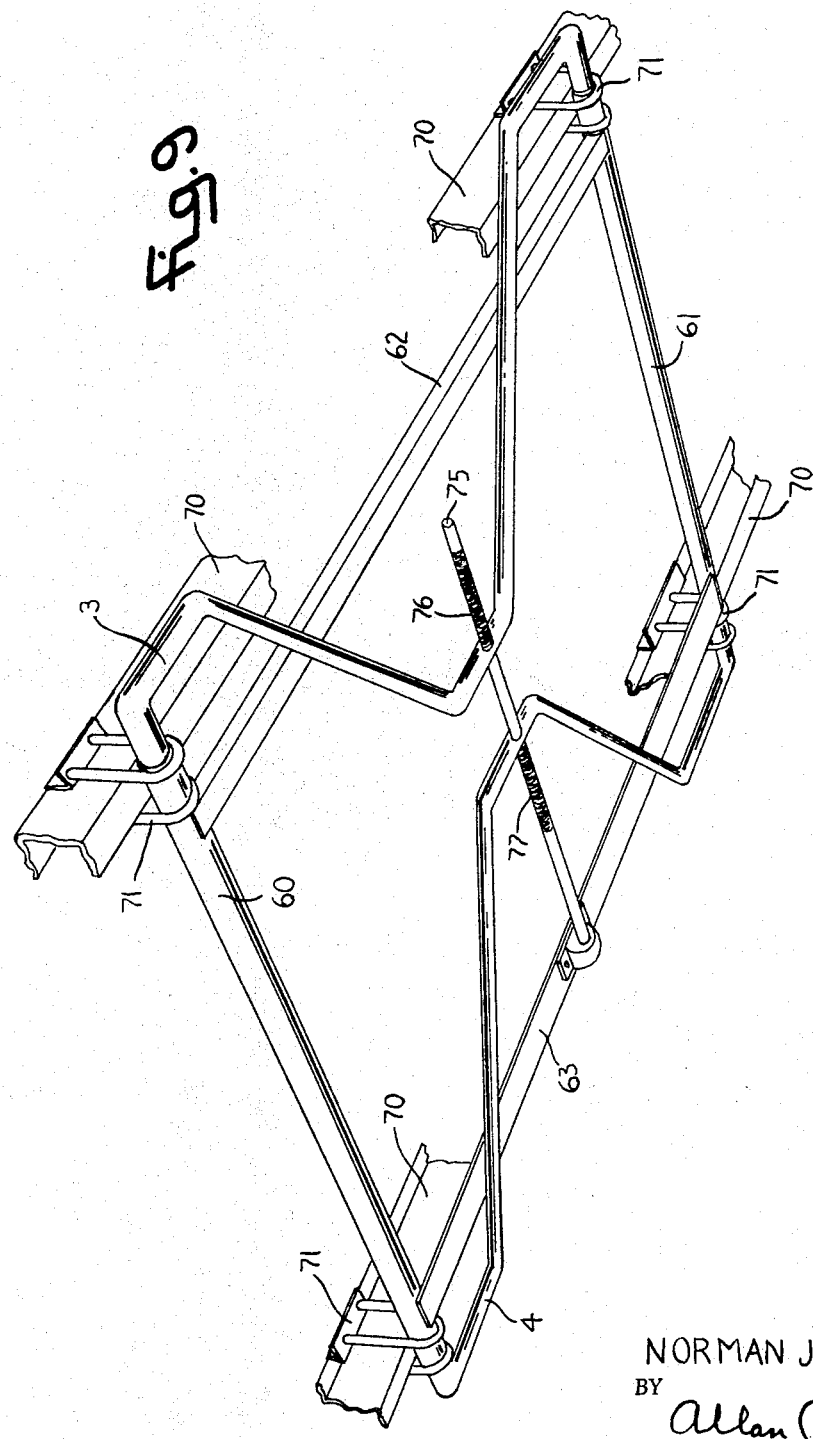

United States Patent Office 3,279,636
Patented Oct. 18, 1966

3,279,636
ATTACHMENT FOR WHEELED VEHICLE
Norman J. Asman, 1000 W. Parkway Blvd.,
Appleton, Wis.
Filed Jan. 18, 1965, Ser. No. 426,009
7 Claims. (Cl. 214—515)

This invention relates to load-carrying attachments for wheeled vehicles and particularly to camper attachments for such vehicles.

Luggage carrying attachments for motor vehicles are generally attached to the roof thereof by means of suction cups and tied down at their opposite ends to hold them firmly in position. It is an object of the present invention to provide a load-carrying attachment for motor vehicles which is supported by the frame or underbody thereof and which may be spaced above the roof of the vehicle. Thus it is possible to use the load-carrying attachment of the present invention on a convertible automobile or on a trailer loaded with a boat or other cargo above which a further load could not ordinarily be carried.

Expandable camper devices are generally transported on a separate trailer in collapsed condition. Such devices require the added initial and maintenance costs of separate axles, wheels, and tires which cannot be used except in connection with the camper. Such devices have also been mounted upon truck-beds, but a camper of the latter type ordinarily can be used only in connection with the truck which carries it, i.e., can be detached therefrom only with great difficulty. It is another object of the present invention to provide a camper device which can be carried on a motor vehicle or trailer without resting on the roof or other top surfaces thereof.

Another object of the present invention is to provide a camper which entails a minimum initial investment, which can be stored upon its own supports, which can readily be mounted on and detached from the carrying vehicle, and which can easily be expanded or collapsed as desired.

Further objects and advantages will be apparent from the following description taken in connection with the accompanying drawings, in which.

Figure 5:
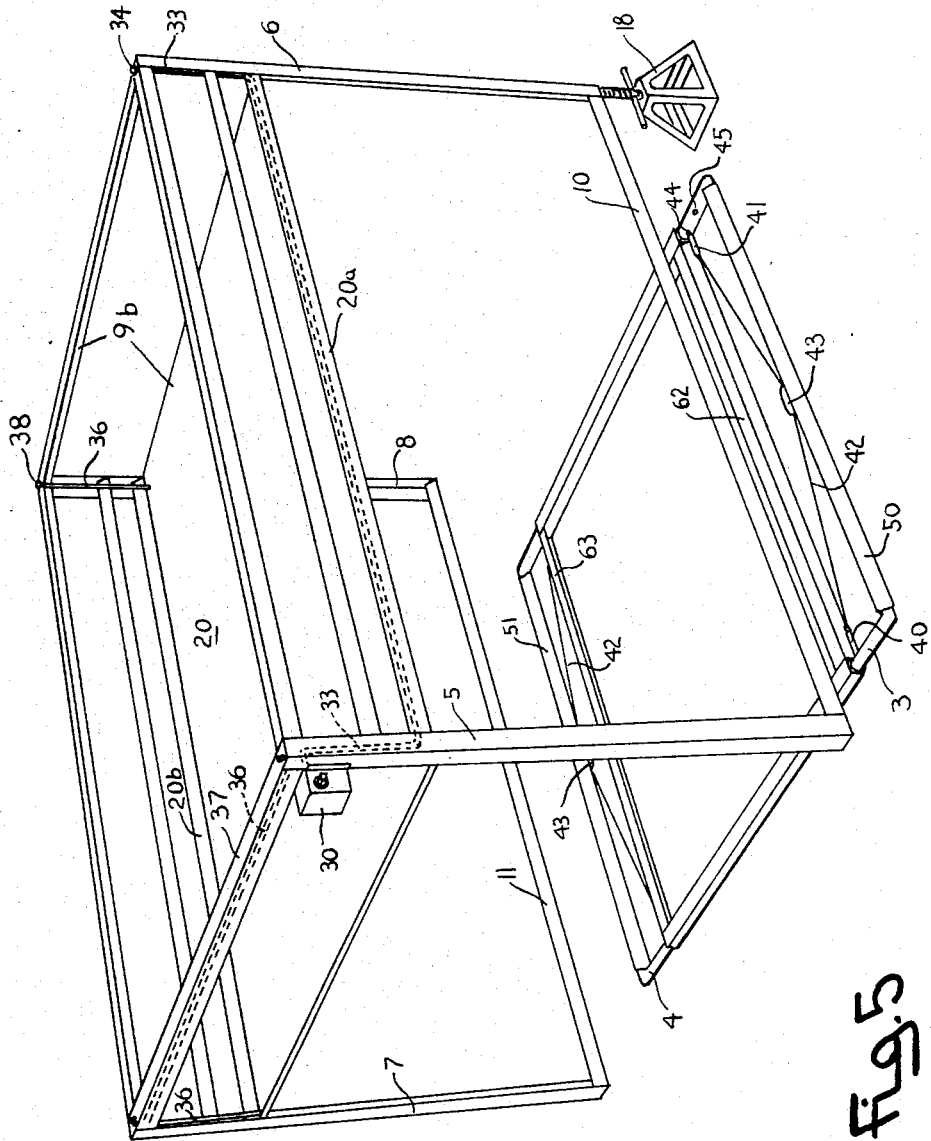
FIGURE 5 is a perspective view of a load-carrying attachment and mounting means according to a further embodiment of the invention.
Figure 6:
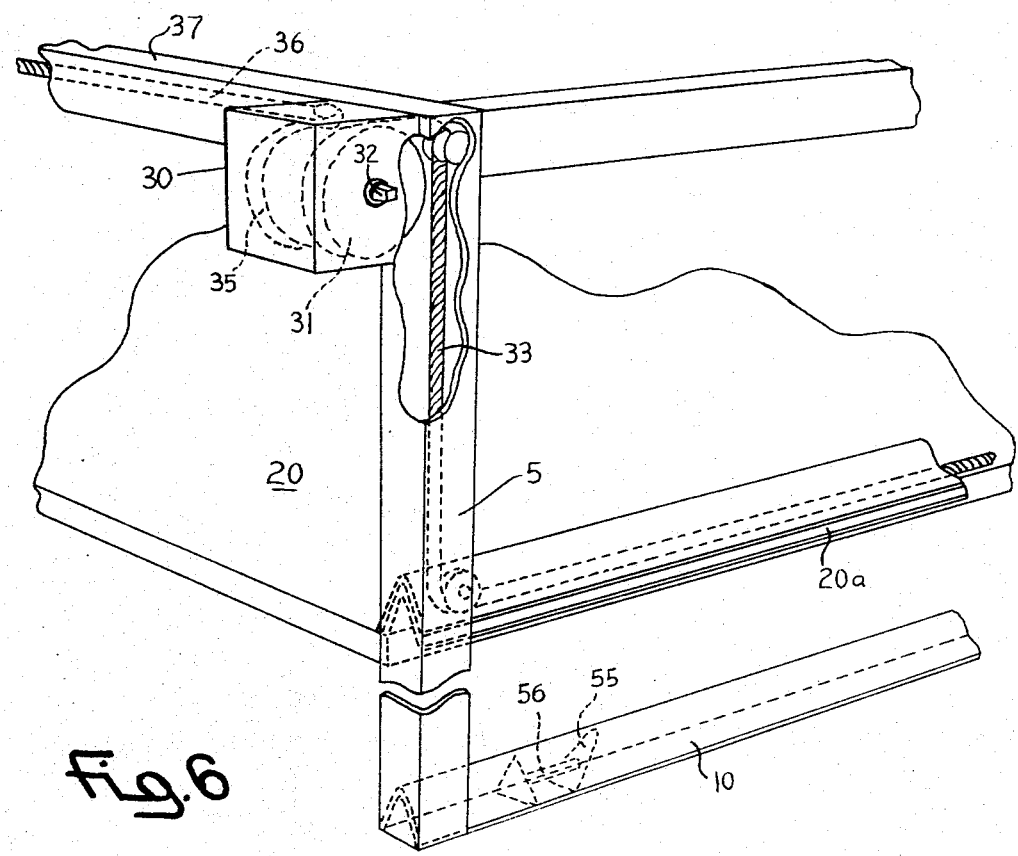
Figure 7:
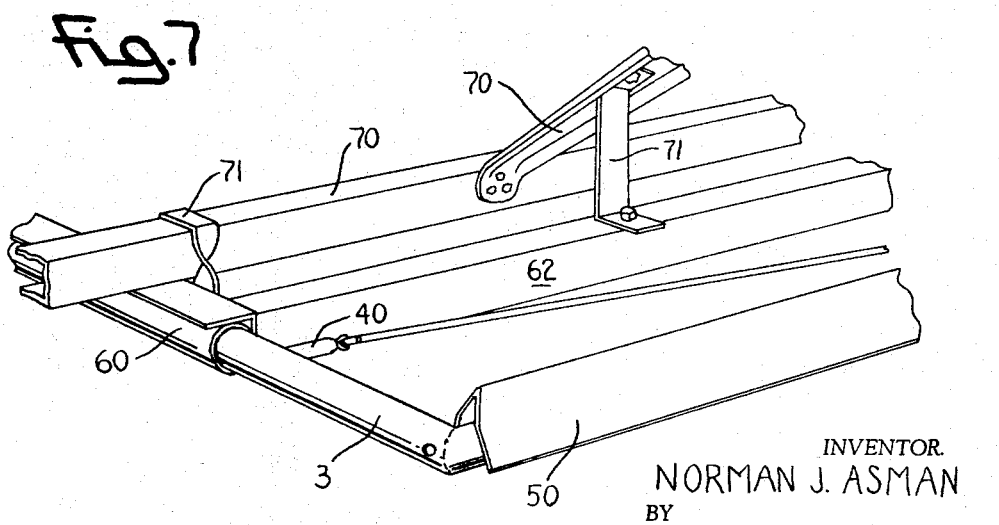

FIGURE 6 is an enlarged fragmental view of a portion of the attachment of FIGURE 5 showing a coupling means which may be used to secure the attachment to the mounting means, FIGURE 7 is an enlarged fragmental view showing the mounting means attached to an automobile frame, FIGURE 8 is a plan view of an automobile with an attachment of the present invention as viewed from beneath, FIGURE 9 is a perspective view from beneath showing the mounting means and a device for extending and retracting the same.

Figure 1:
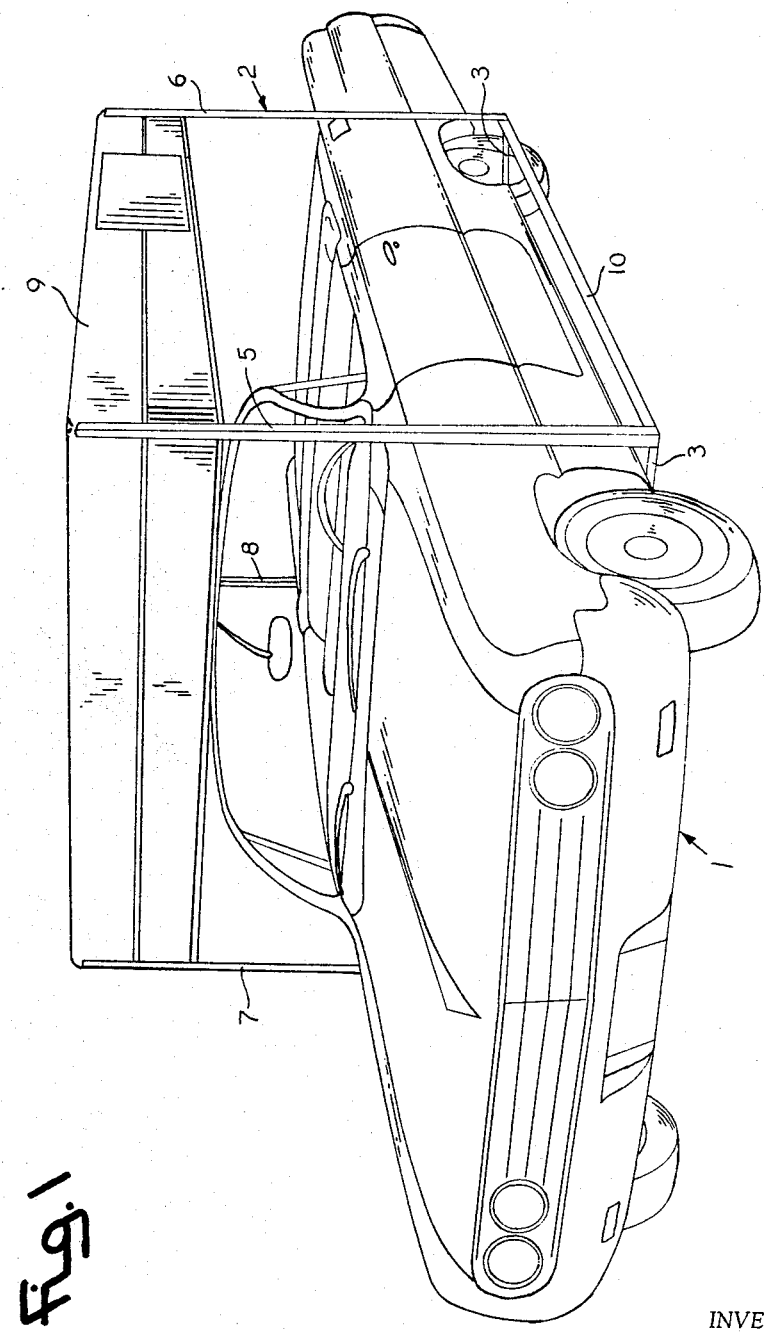
FIGURE 1 is a perspective view of an attachment of the present invention mounted on an automobile.
Figure 3:
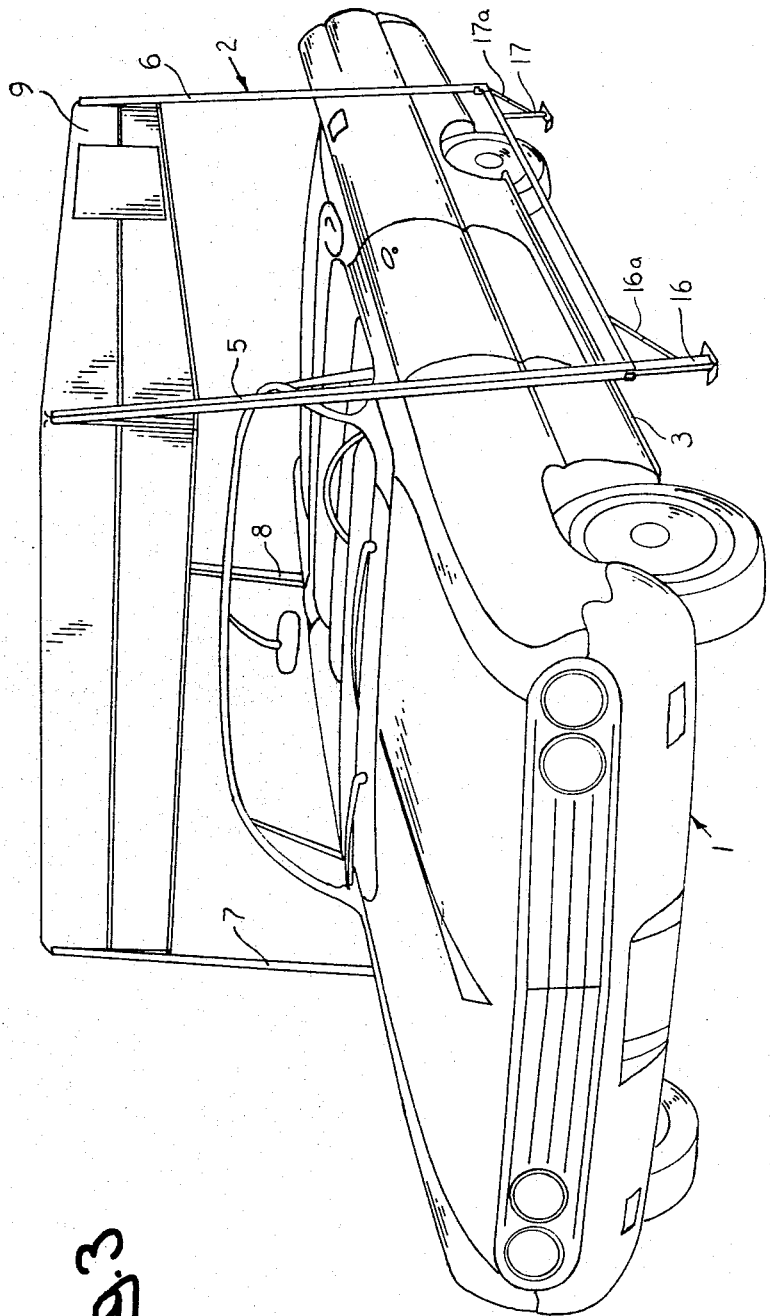
FIGURE 3 is a perspective view showing the attachment detached from its mounting means.

Referring more particularly to the drawings, there is seen in FIGURE 1 an automobile 1 with an attachment 2 of the present invention mounted thereon. Means 3 are an extendable portion of the mounting frame of the device secured to the underbody of the automobile and are releasably attached to the main frame of the attachment as best seen in FIGURE 3. As best seen in FIGURES 5 and 8, there is a corresponding attaching element 4 on the opposite side of the mounting frame. Means 3 and 4 can be retracted when detached from the main frame of the attachment into a storage position under the automobile. In the storage position the mounting elements do not interfere with the normal use of the automobile and therefore can be carried thereon without inconvenience.

Figure 2:
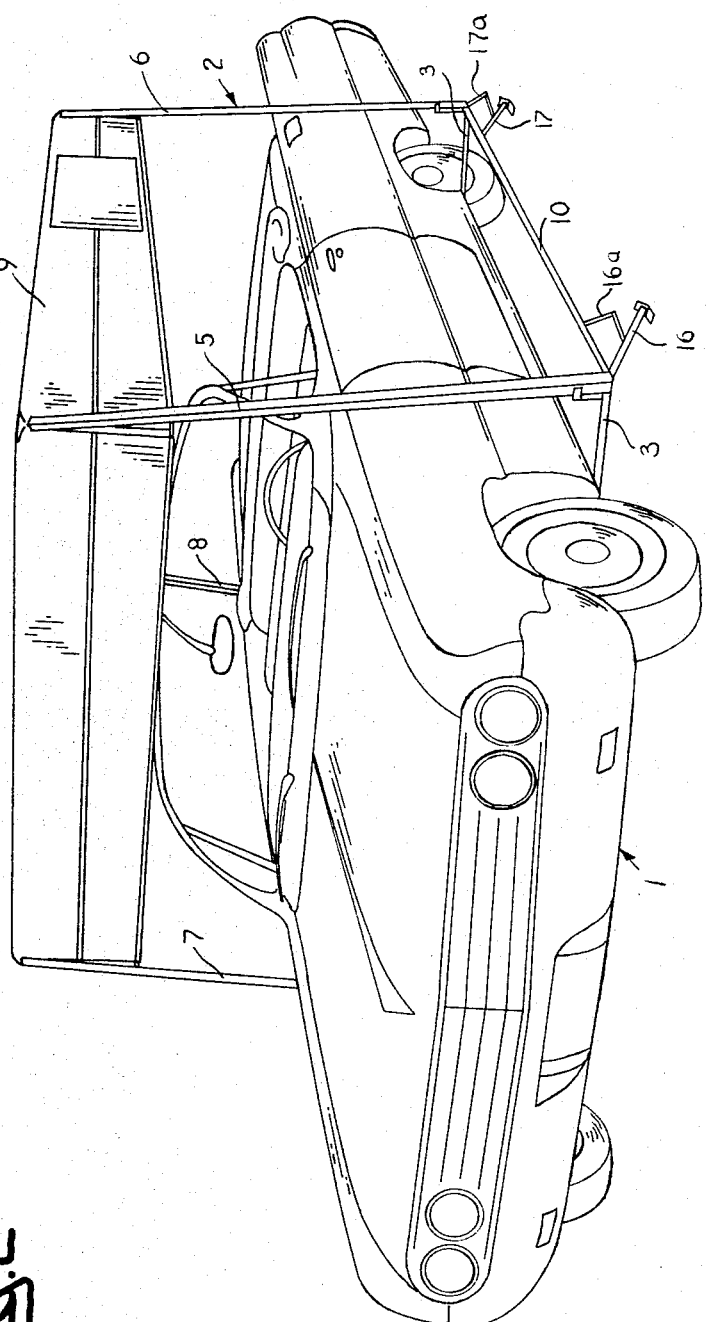
FIGURE 2 is a perspective view of the attachment of FIGURE 1 with the legs thereof in position to raise the same off the mounting means in accordance with one embodiment of the invention.
Figure 4:
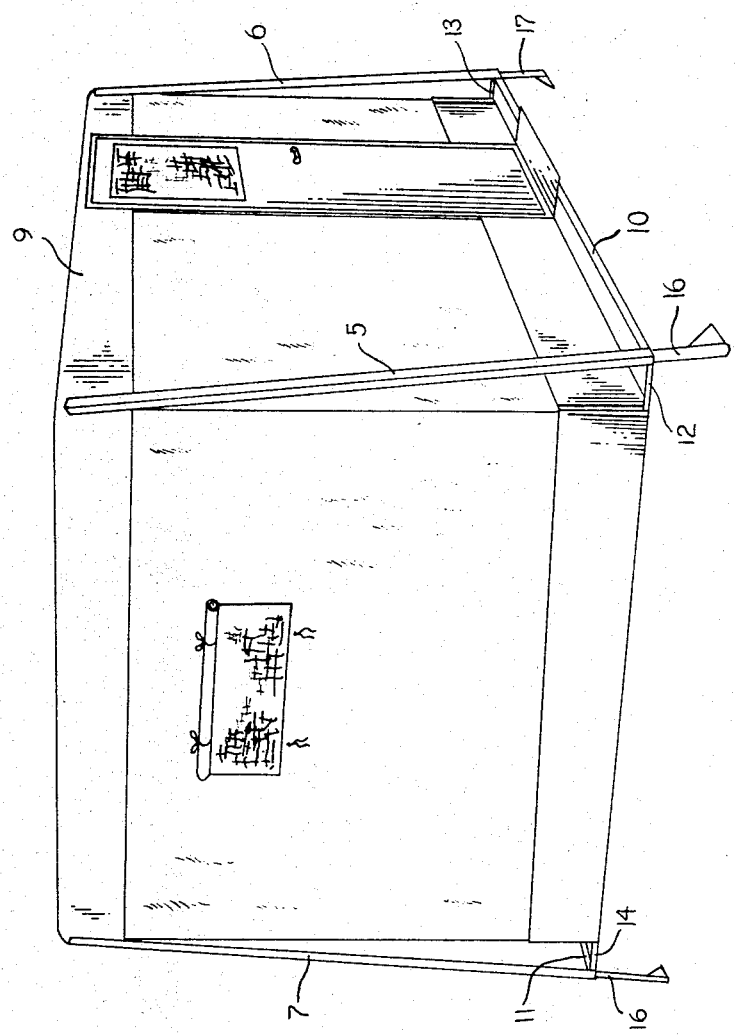
FIGURE 4 is a perspective view of one embodiment of the invention showing the tent portion of a camper in expanded position.

The main frame of attachment 2 includes vertical frame elements 5, 6, 7 and 8 on opposite sides of the automobile or other wheeled vehicle in connection with which the attachment is used. These frame elements are spaced outwardly from the automobile a sufficient distance to prevent the same from contacting and marring the finish of the automobile. Frame elements 5–8 are secured at their upper ends to load-carrying device 9. Device 9 may be a simple luggage rack either open or closable on top, or it may be a camping compartment or tent in collapsed position. Such a tent 9a is shown in its expanded or set-up position in FIGURE 4. The lower ends of frame elements 5 and 6 are interconnected by a cross element 10 and the lower ends of frame elements 7 and 8 are interconnected by a similar cross element 11. In the embodiment shown in FIGURES 2–4, frame elements 5–8 are shown to be pivotably connected at their upper ends to load-carrying device 9. If these frame elements are thus pivotable, more room is provided for maneuvering the automobile in and out from under the attachment. As seen in FIGURE 4, the tilt of the elements also gives greater stability to the tent 9a, when the elements 5–8 are secured in the outwardly pivoted positions by brace elements 12, 13, 14, and 15 (not shown). Brace elements 12–15 may be either metal rods or flexible straps or ropes.

Various types of devices can be used for supporting or lifting the attachment while the same is being disconnected from the automobile. For example, a set of blocks could be placed under the attachment when it is to be disconnected. In the embodiment shown in FIGURES 2 and 3, the set of pivotable legs 16 and 17 is provided on each side of the attachment. In this case the attachment is raised out of contact with elements 3 and 4 by simply lowering the legs 16 and 17 to the position shown in FIGURE 2, placing the automobile in reverse, and driving the same backward until the legs are in the vertical position. The bolts, pins, or other means connecting the elements 3 and 4 to elements 10 and 11 obviously must be disconnected prior to this so that the main frame can be lifted out of contact with the attaching frame. Legs 16 and 17 are provided with bolts or pins or the like to hold the same in the vertical position shown in FIGURE 3. Hinged brace elements 16a and 17a can also be provided with means to lock the same in the extended position. In the embodiment of FIGURE 5, there is shown a jack 18 which may be substituted for the legs 16 and 17. It will be understood that one such jack should be placed at each corner of the attachment. The attachment can then be raised simply by extending each of the jacks until the weight is removed from elements 3 and 4 and sufficient clearance is provided so that elements 3 and 4 can be retracted. The walls of the camper or tent portion of the attachment shown in the embodiment of FIGURES 1–4 may be formed from either a flexible material such as waterproof canvas or a relatively more rigid material such as sheet metal. In the case of canvas or like material, the walls can be designed to be rolled up. A roller could be provided at the top of each panel as a core around which the wall material can be wound and unwound. In the case of sheet metal walls or the like it is necessary to form the walls from hinged or telescoping sections. Such constructions are conventional and many modifications which lend themselves to use in conjunction with the present invention will be apparent to those skilled in the art.

Several other optional features are illustrated in FIGURE 5. As seen, the load-carrying portion of the attachment may be an open-top luggage carrying compartment 9b. Compartment 9b has a bottom floor 20 which may be raised and lowered by the winch mechanism 30 shown in FIGURES 5–7. This winch mechanism may include pulley 31 having a central shaft 32 which maybe turned by a simple hand crank to raise and lower platform 20. Cable 33 is wound around pulley 31 and is threaded over suitable pulleys which guide the cable along the inside of frame element 5, thence along flange 20a which forms the edge of platform 20, and up the side of frame element 6 to the top. The end of the cable is fixedly secured at point 34. A second pulley 35 also driven by shaft 32 and a second cable 36 is provided to raise and lower the opposite side of the platform. Cable 36 travels along the top edge 37 of platform 9b to the top of frame element 7 where it passes over a pulley, then extends downward to side 20b of platform 20, up along the inside of element 8 to the top thereof where it is fixedly secured at point 38. It will then be apparent that the rotation of shaft 32 will cause platform 20 to be raised or lowered as the cables 33 and 35 are wound on or off of the pulleys 31 and 35 respectively. This arrangement provides a luggage carrier which can be loaded in the lowered position, raised, and then attached to the vehicle. This eliminates the need for lifting the items to the top of the vehicle, reducing the amount of force needed to lift the load as well as the danger of scratching the vehicle.

Also shown in FIGURES 5 and 7 are fastening means 40 and 41 which can be used to lock elements 3 and 4 in the extended or retracted position. The locking means preferably comprise pin elements (not shown) which are urged into holes 44 or 45 in elements 3 and 4 by coil springs which encircle the pins and press against a shoulder thereon. The opposite ends of each spring abutts against the end of a hollow housing in which the pins and springs are contained. The pins can be simultaneously detached by means of cables 42 each of which is attached at its opposite ends to the pins on one side of the attachment. Cables 42 are threaded at their central points through rotatable handles 43. The pin elements of means 40 and 41 can be simultaneously removed by turning handle 43 to tighten the cable thereby retracting the pins. Since the pins are spring loaded, they return to their extended positions when handle 43 is released.

In the embodiment shown in FIGURES 5–7, there is also shown a means for securing the elements 3 and 4 to elements 10 and 11 when the attachment is mounted on the automobile. This embodiment greatly assists in aligning the elements with respect to each other during mounting. The outer extremities of elements 3 and 4 are provided with angular elements 50 and 51 which have upwardly converging top surfaces. Elements 10 and 11 are provided with concave bottom surfaces which mate with the upper surfaces of elements 50 and 51. Elements 50 and 51 will then tend to be self-aligning with respect to elements 10 and 11 as the frame is lowered onto the attaching means. A simple locking device or clip 55 is shown in FIGURE 6. It will be understood that such a device should be placed at each end of elements 10 and 11. Clip 55 is urged inwardly by spring 56. As the attachment is lowered onto element 50, the slope of clip 55 will cause the same to be retracted enough for the end of element 50 to move therepast. When element 50 is seated in element 10, clip 55 will be free to return to its extended position under element 50, thereby holding the attachment securely on the mounting means.

As best seen in FIGURES 7–9, elements 3 and 4 are slidably mounted in tubes or similar means 60 and 61, which are secured to the underbody of the vehicle. Cross elements 62 and 63 may optionally be provided to give added strength to the mounting frame. The mounting means of the attachment are secured to the frame or underbody of the vehicle, generally indicated by numeral 70, by means of suitable brackets 71. It will be understood that each type of motor vehicle or trailer will have a somewhat different frame or underbody configuration and it will be necessary to provide somewhat different brackets for each make or model of vehicle on which it is desired to mount the attachment of the present invention.

In FIGURE 9 is shown a device for simultaneously extending and retracting elements 3 and 4. This device consists of a shaft 75 which threadably engages the central portion of each of elements 3 and 4. Threaded portions 76 and 77 of shaft 75 should be threaded in opposite directions so that rotation of the shaft in one direction will cause elements 3 and 4 to move away from each other and rotation in the opposite direction will cause them to move toward each other. A detachable crank handle can be conveniently included with the attachment for turning shaft 75 by hand.

While the attachments of the present invention have been illustrated for use in connection with an automobile, the invention is not limited thereto, as the attachment can be modified for use in combination with nearly any type of wheeled vehicle. The attachments can be designed by appropriate modification of the mounting brackets and spacing of the frame elements for use on a trailer towed behind an automobile or other motor-driven vehicle.

For example, an attachment can be provided to be carried on a boat-carrying trailer, thereby providing a means for towing both a boat and camper attachment on a single trailer.

While various illustrative embodiments of the invention have been shown in the drawings and described in detail herein, the invention is susceptible of embodiment in different forms. It is to be understood that the present disclosure is an exemplification of the principles of the invention, and is not intended to limit the invention to the particular embodiments illustrated. The scope of the invention will be pointed out in the appended claims.

I claim:
1. A load supporting attachment for a wheeled vehicle which comprises:
   (a) laterally extensible and retractable mounting means secured to the underbody of said vehicle,
   (b) a frame comprising upwardly extending frame elements adjacent opposite sides of said vehicle, said frame elements being spaced apart a distance greater than the width of said vehicle,
   (c) means for releasably attaching said frame to said mounting means, at points on opposite sides of said vehicle spaced apart a distance greater than the width of said vehicle, said mounting means being extended when said attachment is mounted on said vehicle and being retractable to a position beneath the vehicle when said attachment is dismounted such that the width of said mounting means when retracted is less than the width of said vehicle, and
   (d) a load carrying device supported above the top of said vehicle and secured to the upper portions of said frame elements.
2. The attachment of claim 1 wherein said load carrying device is spaced above the top of said vehicle.
3. A camper attachment for a wheeled vehicle which comprises:
   (a) laterally extensible and retractable mounting means secured to the underbody of said vehicle,
   (b) a frame comprising upwardly extending frame elements adjacent opposite sides of said vehicle, said frame elements being spaced apart a distance greater than the width of said vehicle,
   (c) means for releasably attaching said frame to said mounting means at points on opposite sides of said vehicle spaced apart a distance greater than the width of said vehicle, said mounting means being extended when said attachment is mounted on said vehicle and being retractable to a position beneath the vehicle when said attachment is dismounted such that the width of said mounting means is less than the width of said vehicle, and (d) a camping compartment in collapsed position secured to the upper portions of said frame elements and thereby supported above the top of said vehicle, said camping compartment comprising walls capable of being expanded downwardly when said attachment is detached from said vehicle.

4. The attachment of claim 3 wherein extendable supporting legs are provided at the lower ends of said frame elements to support said attachment when the same is detached from said vehicle.

5. The attachment of claim 3 wherein said mounting means includes elements extendable toward both sides of said vehicle and wherein said frame attaching means is adapted to releasably engage said extendable elements and wherein said extendable elements include upwardly converging surfaces and said frame attaching means include downwardly facing concave portions adapted to engage said converging surfaces to support said attachment on said vehicle.

6. The attachment of claim 3 wherein the lower ends of said frame elements can be pivoted away from said vehicle to disengage said releasable frame attaching means from said mounting means.

7. The attachment of claim 6 wherein said frame attaching means on opposite sides of said vehicle are interconnected by a shaft oppositely threaded at portions threadably engaging said attaching means on opposite sides of said vehicle whereby rotation of said shaft in one direction will move the frame attaching means on both sides of said vehicle into engagement with said mounting means and rotation of said shaft in the opposite direction will simultaneously move the frame attaching means of both sides of said vehicle out of engagement with said mounting means.

References Cited by the Examiner
UNITED STATES PATENTS

| | | | |
|---|---|---|---|
| 1,471,433 | 10/1923 | West | 296—23 |
| 2,100,971 | 11/1937 | McDonald | 224—42.11 |
| 3,111,955 | 11/1963 | Green | 296—23 X |
| 3,148,795 | 9/1964 | Leach | 214—515 |
| 3,160,434 | 12/1964 | Hedgepeth | 214—515 X |

References Cited by the Applicant
UNITED STATES PATENTS

| | | |
|---|---|---|
| 1,436,984 | 11/1922 | Follett. |
| 1,471,433 | 10/1923 | West. |
| 1,477,111 | 12/1923 | Eaton. |
| 2,617,572 | 11/1952 | Knight |
| 2,718,015 | 9/1955 | Fisk. |
| 2,995,397 | 8/1961 | Eames. |

MARVIN A. CHAMPION, *Primary Examiner.*

GERALD M. FORLENZA, *Examiner.*

F. E. WERNER, *Assistant Examiner.*